(12) United States Patent
Mishina et al.

(10) Patent No.: US 8,349,027 B2
(45) Date of Patent: Jan. 8, 2013

(54) PROCESS FOR PRODUCING DYED PLASTIC LENS

(75) Inventors: Misa Mishina, Tokyo (JP); Takaaki Kubotera, Tokyo (JP); Shinya Miyajima, Tokyo (JP); Yoko Sakai, Tokyo (JP); Shinichi Yamashita, Tokyo (JP)

(73) Assignee: HOYA Corporation, Tokyo (JP)

( * ) Notice: Subject to any disclaimer, the term of this patent is extended or adjusted under 35 U.S.C. 154(b) by 0 days.

(21) Appl. No.: 12/846,985

(22) Filed: Jul. 30, 2010

(65) Prior Publication Data

US 2011/0126364 A1 Jun. 2, 2011

(30) Foreign Application Priority Data

Jul. 31, 2009 (JP) .................................. 2009-180097

(51) Int. Cl.
*D06P 5/28* (2006.01)
(52) U.S. Cl. ................................. 8/507; 8/471
(58) Field of Classification Search ............... 8/471, 507
See application file for complete search history.

(56) References Cited

U.S. PATENT DOCUMENTS

| 2005/0071934 A1* | 4/2005 | Inuzuka et al. | 8/509 |
| 2006/0075583 A1 | 4/2006 | Inuzuka et al. | |
| 2009/0076208 A1* | 3/2009 | Usugi et al. | 524/420 |

FOREIGN PATENT DOCUMENTS

| EP | 1 388 607 A2 | 2/2004 |
| EP | 1 388 607 A3 | 2/2004 |
| JP | 2005-156630 | 6/2005 |

OTHER PUBLICATIONS

Derwent abstract 2005-076500 Inuzuka et al. 2009.*
Extended European Search Report issued Dec. 29, 2010, in Patent Application No. 10170894.9.
U.S. Appl. No. 13/148,140, filed Oct. 6, 2011, Mishina, et al.

* cited by examiner

*Primary Examiner* — Lorna M Douyon
*Assistant Examiner* — Amina Khan
(74) *Attorney, Agent, or Firm* — Oblon, Spivak, McClelland, Maier & Neustadt, L.L.P.

(57) ABSTRACT

A process which enables a plastic lenses having a refractive index of 1.7 or greater and, in particular, plastic lenses having a refractive index of 1.7 to 1.8 to be dyed uniformly to a great density without unevenness, which is, specifically, a process for producing a dyed plastic lens which comprises conducting following steps (1), (2) and (3) in this order: Step (1): a step comprising coating a substrate at 60° C. or lower with an ink comprising a sublimation dye; Step (2): a step comprising decreasing content of water in the ink comprising sublimation dye coating the substrate to 50% by mass or less of the entire ink; and Step (3): a step comprising, after placing a plastic lens in a manner such that a face for dying of the lens and a face of the substrate coated with the ink comprising a sublimation dye face each other, sublimating the sublimation dye in the ink comprising a sublimation dye coating the substrate by heating the substrate obtained after Step (2) under a degree of vacuum of about $1 \times 10^4$ Pa or smaller to dye the plastic lens.

19 Claims, 4 Drawing Sheets

Pigments partially aggregated by crystallization

Fig. 5

Pigments partially aggregated by crystallization

Fig. 6

Pigments partially aggregated by crystallization

Fig. 7

Pigments partially aggregated by crystallization

PROCESS FOR PRODUCING DYED PLASTIC LENS

FIELD OF THE INVENTION

The present invention relates to a process for producing a dyed plastic lens in accordance with the dying process with sublimation and, more particularly, to a process for producing a dyed plastic lens which comprises decreasing the content of water in an ink comprising a sublimation dye to 50% by mass or less of the entire ink and, thereafter, sublimating the sublimation dye in the ink comprising a sublimation dye.

BACKGROUND ART

Heretofore, dying processes such as the dying process by dipping, the dying process under a pressure and the dying process by heating a dye membrane have been utilized for dying spectacle lenses. However, in accordance with these processes, it is difficult that uniform dying to a great density without unevenness is achieved for plastic lenses having a great refractive index (a refractive index of 1.7 or greater).

To achieve uniform dying to a great density without unevenness for a plastic lens having a great refractive index (a refractive index of 1.7 or greater), various attempts such as dying in accordance with the dying process with sublimation in which the plastic lens is dyed using a sublimation dye have been made. As the process for dying a plastic lens in accordance with the dying process with sublimation, for example, a process in which a substrate for printing prepared by coating a white paper with a dye using a printer is heated to sublimate the dye, and a plastic lens is dyed (refer to Patent Literature 1), and a process in which, after a support heated at 100 to 150° C. in advance is coated with a dye and the coating dye is fixed, the support is treated by heating at a still higher temperature to sublimate the dye, and a plastic lens is dyed (refer to Patent Literature 2), have been known.

Citation List

Patent Literatures

[Patent Literature 1] Japanese Patent Application Laid-Open No. 2001-59950

[Patent Literature 2] Japanese Patent Application Laid-Open No. 2005-156630

SUMMARY OF THE INVENTION

Technical Problem

In accordance with the process described in Patent Reference 1, a problem arises in that pigments in the dye are occasionally crystallized at the surface of the plastic lens to cause uneven dying and, in particular, this phenomenon takes place markedly when a plastic lens having a great refractive index is used.

In accordance with the process described in Patent Reference 2, a problem arises in that the temperature of the support itself can change while the dye is applied to the support. It was also found by the studies by the present inventors that, in a coating process using a relatively great amount of dye per one dot such as the coating process using a dispenser, the content of water in the dye per one dot was different to a great degree in early periods and in later periods of the coating due to a great content of water per dot, and a lens was not dyed uniformly when the condition after the dying was examined in detail using a microscope in place of the direct examination with eyes.

It is considered that, in accordance with the dying process with sublimation, no surfactants are present in the vicinity of the pigments attached to the surface of the plastic lens since the surfactants in the ink comprising the sublimation dye are not sublimated in combination with the pigments, and crystallization of the pigments tends to take place to cause uneven dying.

The present invention has an object of providing a process for producing a dyed plastic lens in accordance with which a plastic lens having a refractive index of 1.7 or greater and, in particular, a refractive index of 1.7 to 1.8, can be dyed uniformly to a great density without unevenness.

Solution to Problem

The present invention provides the processes described in the following in [1] to [4].

[1] A process for producing a dyed plastic lens which comprises conducting following steps (1), (2) and (3) in this order:

Step (1): a step comprising coating a substrate at 60° C. or lower with an ink comprising a sublimation dye;

Step (2): a step comprising decreasing content of water in the ink comprising sublimation dye coating the substrate to 50% by mass or less of the entire ink; and Step (3): a step comprising, after placing a plastic lens in a manner such that a face for dying of the lens and a face of the substrate coated with the ink comprising a sublimation dye face each other, sublimating the sublimation dye in the ink comprising a sublimation dye coating the substrate by heating the substrate obtained after Step (2) under a degree of vacuum of $1 \times 10^4$ Pa or smaller to dye the plastic lens;

[2] The process for producing a dyed plastic lens described above in [1], wherein the treatment of heating in Step (2) is conducted while temperature of heating is set in a manner such that temperature of the substrate is 0 to 250° C. under a degree of vacuum of $1 \times 10^{-3}$ Pa to an ordinary pressure;

[3] The process for producing a dyed plastic lens described above in any one of [1] and [2], wherein the sublimation of the sublimation dye in Step (3) is conducted while the temperature of heating is set in a manner such that temperature of the substrate is 0 to 280° C. under a degree of vacuum of $1 \times 10^{-3}$ to $1 \times 10^3$ Pa;

[4] The process for producing a dyed plastic lens according to any one of claims 1 to 3, wherein Step (3) comprises following two steps of Steps (3-1) and (3-2):

Step (3-1): a step comprising, after placing a plastic lens in a manner such that a face for dying of the lens and a face of the substrate coated with the ink comprising a sublimation dye face each other, sublimating the sublimation dye in the ink comprising a sublimation dye coating the substrate by heating the substrate obtained after Step (2) under a degree of vacuum of $1 \times 10^4$ Pa or smaller to attach the sublimated dye to the face for dying of the plastic lens without permeation into the plastic lens; and Step (3-2): a step comprising allowing the sublimation dye attached to the plastic lens to permeate into the lens by treatment of heating the plastic lens having the attached sublimation dye obtained in Step (3-1).

Advantageous Effects of Invention

The process which enables to dye a plastic lens having a refractive index of 1.7 or greater and, in particular, a refractive index of 1.7 to 1.8, uniformly without unevenness to a great density can be provided by the present invention.

DESCRIPTION OF EMBODIMENTS

The present invention provides a process for producing a dyed plastic lens which comprises conducting following steps (1), (2) and (3) in this order:

Step (1): a step comprising coating a substrate at 60° C. or lower with an ink comprising a sublimation dye;

Step (2): a step comprising decreasing the content of water in the ink comprising sublimation dye coating the substrate to 50% by mass or less of the entire ink; and Step (3): a step comprising, after placing a plastic lens in a manner such that the face for dying of the lens and the face of the substrate coated with the ink comprising a sublimation dye face each other, sublimating the sublimation dye in the ink comprising a sublimation dye coating the substrate by heating the substrate obtained after Step (2) under an approximate vacuum of a degree of vacuum of $1 \times 10^4$ Pa or smaller to dye the plastic lens.

Steps (1) to (3) described above will be described successively in the following.

[Step (1)]

(Substrate)

In Step (1), a substrate is coated with an ink comprising a sublimation dye for dying a plastic lens. The substrate is not particularly limited, and any of substrates comprising inorganic materials, substrates comprising organic materials and substrates comprising metals can be used.

Example of the inorganic material include glass, quartz, mica and woven and nonwoven fabrics comprising inorganic macromolecular compounds such as glass fibers and fibers of carbon silicate. Examples of the organic material include paper. Examples of the metal include aluminum, stainless steel, copper and alloys of these metals. The substrate may be formed with a composite material comprising at least two materials or a multi-layered structural material comprising a plurality of materials.

The thickness of the substrate is not particularly limited. It is preferable that the thickness is 0.5 to 5 mm and more preferably 1 to 3 mm from the standpoint of efficient evaporation of water in the ink comprising a sublimation dye in Step (2) and sufficient sublimation of the sublimation dye in Step (3).

The face of the substrate facing the plastic lens (the face for coating) may have a shape having a curved surface such that little gaps are formed when the substrate is fitted to the curved surface of the plastic lens at the side for dying. In this case, the distance between the substrate and the plastic lens becomes approximately constant over the entire curved surface of the lens. Therefore, the sublimated dye is diffused uniformly over the lens, and the uniform dying of the plastic lens without unevenness can be facilitated. It is preferable that the face of the substrate for coating with the ink comprising a sublimation dye is smooth from the standpoint of uniform dying of the plastic lens.

The temperature of the substrate during the coating is 60° C. or lower and preferably 0 to 60° C. From the standpoint of uniformly dying the plastic lens without unevenness, it is preferable that the temperature is 10 to 50° C., more preferably 15 to 30° C. and most preferably the ordinary temperature (without heating). A temperature of 0° C. or higher is preferable since the efficiency is excellent when the content of water in the ink comprising a sublimation dye is decreased in the later step. When the temperature exceeds 60° C., there is the possibility that water in the ink comprising a sublimation dye is vaporized, and the content of water becomes different at various positions when the content of water in the ink is decreased in the later step, to cause unevenness of the dying as the result.

(Ink Comprising a Sublimation Dye)

The Sublimation Dye Comprised in the Ink Used in Step (1) is not particularly limited as long as the dye exhibits the property of sublimation by heating. The sublimation dyes are industrially easily available. Examples of the commercial product include KAYASET BLUE 906 (manufactured by NIPPON KAYAKU Co., Ltd.); KAYASET BROWN 939 (manufactured by NIPPON KAYAKU Co., Ltd.); KAYASET RED 130 (manufactured by NIPPON KAYAKU Co., Ltd.); KAYALON MICROESTER RED C-LS CONC (manufactured by NIPPON KAYAKU Co., Ltd.); KAYALON MICROESTER RED AQ-LE (manufactured by NIPPON KAYAKU Co., Ltd.); KAYALON MICROESTER RED DX-LS (manufactured by NIPPON KAYAKU Co., Ltd.); DIANIX BLUE AC-E (manufactured by DYSTAR JAPAN Co., Ltd.); DIANIX RED AC-E 01 (manufactured by DYSTAR JAPAN Co., Ltd.); DIANIX YELLOW AC-E NEW (manufactured by DYSTAR JAPAN Co., Ltd.); KAYALON MICROESTER YELLOW C-LS (manufactured by NIPPON KAYAKU Co., Ltd.); KAYALON MICROESTER YELLOW AQ-LE (manufactured by NIPPON KAYAKU Co., Ltd.); KAYALON MICROESTER BLUE C-LS CONC (manufactured by NIPPON KAYAKU Co., Ltd.); KAYALON MICROESTER BLUE AQ-LE (manufactured by NIPPON KAYAKU Co., Ltd.); and KAYALON MICROESTER BLUE DX-LS CONC (manufactured by NIPPON KAYAKU Co., Ltd.).

The sublimation dye is applied to the substrate as the ink comprising a sublimation dye after being dispersed in water. The content of water in the ink comprising a sublimation dye is adjusted, in general, to 50 to 99.5% by mass, preferably 55 to 90% by mass, more preferably 60 to 80% by mass and most preferably 65 to 75% by mass based on the entire amount of the ink. When the content of water in the ink comprising a sublimation dye is adjusted within the above range, the sublimation dye is sufficiently dispersed in the ink, and uniform dying of the plastic lens to a great density can be facilitated. Moreover, Step (2) described later can be efficiently conducted.

The ink comprising a sublimation dye may comprise surfactants, moisturizers, organic solvents, viscosity modifiers, pH modifiers and binders from the standpoint of dying the plastic lens uniformly to a great density.

Examples of the surfactant include anionic surfactants and nonionic surfactants. When the surfactant is added to the ink comprising a sublimation dye, it is preferable that an anionic surfactant and a nonionic surfactant are used in combination.

As the anionic surfactant, conventional surfactants can be used. Examples of the anionic surfactant include sodium alkylsulfonates, sodium alkylbenzenesulfonates, sodium α-oleinsulfonates, sodium dodecylphenyl oxide disulfonates and sodium laurylsulfate. The anionic surfactant may be used singly or in combination of two or more.

As the nonionic surfactant, conventional nonionic surfactants can be used. Examples of the nonionic surfactant include ether-based nonionic surfactants such as polyoxyethylene cetyl ether and polyoxyethylene oleyl ether; ester-based nonionic surfactants such as sorbitan stearate and propylene glycol stearate; ether-ester-based nonionic surfactants such as polyoxyethylene glyceryl monostearate and poloxyethylene sorbitan oleate; and water-soluble polymer-based nonionic surfactants such as polyvinyl alcohol and methylcellulose. The nonionic surfactant may be used singly or in combination of two or more. Among these nonionic surfactants, water-soluble polymer-based nonionic surfactants are preferable, and methylcellulose is more preferable.

When the ink comprising a sublimation dye comprises a surfactant, it is preferable that the content of the anionic surfactant in the ink is adjusted to 0.1 to 10% by mass, more preferably 0.2 to 5% by mass and most preferably 0.2 to 1% by mass, and it is preferable that the content of the nonionic surfactant in the ink is adjusted to 0.1 to 10% by mass, more preferably 0.2 to 5% by mass and most preferably 0.2 to 1% by mass. When the contents of the surfactants are within the above respective ranges, the plastic lens can be dyed to a great density more uniformly.

Examples of the moisturizer include pyrrolidone-based moisturizers such as 2-pyrrolidone and N-methyl-2-pyrrolidone; amide-based moisturizers such as dimethyl sulfoxide and imidazolidinone; polyhydric alcohol-based moisturizers such as ethylene glycol, diethylene glycol, triethylene glycol, propylene glycol, dipropylene glycol, D-sorbitol and glycerol; and trimethylolmethane. The moisturizer may be used singly or in combination of two or more. Among these moisturizers, polyhydric alcohol-based moisturizers are preferable, and glycerol is more preferable. When the ink comprising sublimation dye comprises the moisturizer, it is preferable that the content of the moisturizer in the ink is adjusted to 5 to 30% by mass and more preferably 10 to 25% by mass. When the content of the moisturizer is within the above range, the plastic lens can be dyed to a great density more uniformly.

The process for applying the ink comprising a sublimation dye to the substrate is not particularly limited. Examples of the process include the spray coating process, the bar coating process, the roll coating process, the spin coating process, the ink dot coating process and the ink jet process.

When the ink dot coating process is used among the above processes, a relatively long time (30 seconds to 3 minutes) is required for application of the ink comprising a sublimation dye, and the mass of the ink comprising a sublimation dye per dot is relatively great (about $10^{-8}$ to 1 g, occasionally $10^{-7}$ to $10^{-3}$ g). In contrast, when the ink jet process is used, the mass of the ink comprising a sublimation dye per dot is about $10^{-12}$ g. When the ink dot process is utilized and the process of heating the substrate at 100 to 150° C. in advance is conducted as described in Patent Reference 2, the content of water per dot of ink is different greatly in the early periods and in the later periods of the coating, and achieving the uniform dying without unevenness tends to become difficult. In the present invention, the problem found in Patent Literature 2 does not arise even when the ink dot coating process is utilized. Therefore, the effect of the present invention tends to be more remarkably exhibited when the ink dot coating process is utilized. In other coating processes, for example, in the ink jet process, it is required that particles of the dye be made very small to prevent clogging. Since this is not necessary in the ink dot coating process, dyes including inexpensive sublimation dyes can be used without being affected by specifications of the dye.

[Step (2)]

In Step (2), the content of water in the ink comprising a sublimation dye applied to the substrate in Step (1) is decreased to 50% by mass or smaller of the entire ink. From the standpoint of dying the plastic lens uniformly in a fine level, it is preferable that the content of water is decreased to 40% by mass or smaller, more preferably 30% by mass or smaller and most preferably 20% by mass or smaller of the entire ink. When Step (3) described below is conducted while the content of water in the entire ink exceeds 50%, it is confirmed by the observation using a microscope (the magnification: 1,000 times) that unevenness is present and the dying is not achieved uniformly even when the plastic lens appears to be dyed uniformly without unevenness by the direct observation with eyes. Therefore, there is the possibility that products not satisfying the specification are produced in a great amount in the mass production of the dyed plastic lens.

As the process for decreasing the content of water in the ink comprising a sublimation dye, the treatment by heating is preferable from the standpoint of the operation of the production although the process is not particularly limited. When it is desired that the treatment by heating is conducted without taking a long time in the operation of the production and the substrate and the lens are not affected, the temperature of heating is set in a manner such that the temperature of the substrate is the boiling point of water (100° C.)+20° C. or higher, preferably 120 to 250° C., more preferably 120 to 200° C., still more preferably 120 to 180° C. and most preferably in the range of 125 to 170° C., under the ordinary pressure, for example. The treatment of heating may be conducted under a reduced pressure or at the ordinary pressure due to convenience for the operation. Specifically, the treatment of heating is conducted under a reduced pressure in the range of $1\times10^{-3}$ Pa to the ordinary pressure which can be achieved by using a conventional apparatus. When the treatment of heating is conducted under a reduced pressure in the range of $1\times10^{-3}$ Pa to the ordinary pressure, the temperature of heating can be suitably set in the range of 0 to 250° C.

In this specification, "ordinary pressure" means 1 air pressure (atmospheric pressure), that is to say, about $1\times10^{5}$ Pa.

As for the time of the treatment by heating, the process of heating at a high temperature for a short time or the process of heating at a low temperature for a long time may be conducted. Under the above condition which is preferable for the operation of the production, when the pressure is set at the ordinary pressure and the temperature is in the range of "the set temperature-20° C." to the set temperature, the set temperature being in the range of 150 to 250° C., the time of heating is, in general, 70 seconds or longer, preferably 90 seconds or longer and more preferably 100 seconds or longer; and 600 seconds or shorter, preferably 500 seconds or shorter and more preferably 400 seconds or shorter. When the set temperature is in the range of 120 or higher and lower than 150° C. and the temperature is in the range of "the set temperature-20° C." to the set temperature, the time of heating is, in general, 700 seconds or longer and preferably 800 seconds or longer; and 1,200 seconds or shorter and preferably 1,000 seconds or shorter. The above descriptions can be applied when the treatment of heating is conducted under a reduced pressure. The time of heating under the reduced pressure can be adjusted in the same ranges as those described above when the set temperature is in the range of the boiling point of water+50° C. to 150° C. and in the range of the boiling point of water+20° C. or higher and lower than 50° C., the boiling point of water under the reduced pressure being based on the vapor pressure curve. When the content of water in the ink comprising a sublimation dye applied to the substrate in Step (1) can be adjusted at 50% by mass or smaller, the time of heating is not limited to the above ranges.

When the treatment of heating is conducted under the above condition, the content of water in the ink comprising a sublimation dye can be easily and efficiently decreased to the prescribed value described later and sublimation of the sublimation dye itself can be suppressed when the temperature of the treatment of heating is in the range described above. In Step (2), it is preferable that sublimation of the sublimation dye is suppressed to 40% by mass or smaller, more preferably 20% by mass or smaller, still more preferably 10% by mass or smaller and most preferably 5% by mass or smaller (each range including 0% by mass).

[Step (3)]

In Step (3), the plastic lens is placed in a manner such that the face for dying of the lens and the face of the substrate coated with the ink comprising a sublimation dye face each other. The placement of the plastic lens and the substrate can be conducted in a manner conducted in conventional dying processes with sublimation. For example, FIG. 2 in Patent Literature 1 and FIGS. 1 and 2 in Patent Literature 2 can be referred to. It is preferable that the distance between the substrate and the central point of the plastic lens is 15 to 120 mm, more preferably 17 to 80 mm and most preferably 17 to 30 mm from the standpoint of dying the plastic lens to a great density.

(Plastic Lens)

The raw material of the plastic lens used in Step (3) is not particularly limited. Examples of the raw material of the plastic lens include homopolymers of monomers having sulfide linkage; copolymers of monomers having sulfide linkage and at least one other monomer; homopolymers of methyl methacrylate; copolymers of methyl methacrylate and at least one other monomer; homopolymers of diethylene glycol bis-allylcarbonate; copolymers of diethylene glycol bisallylcarbonate and at least one other monomer; acrylonitrile-styrene copolymers; copolymers having a halogen; polycarbonates; polystyrene; polyvinyl chloride; unsaturated polyesters; polyethylene terephthalate; polyurethanes; polythiourethanes; and epoxy resins. Among these raw materials, homopolymers of monomers having sulfide linkage and copolymers of monomers having sulfide linkage and at least one other monomer are preferable from the standpoint of obtaining a refractive index of 1.7 or greater.

The shape of the plastic lens is not particularly limited. Plastic lenses having various curved surfaces can be used. For example, plastic lenses having spherical surfaces, non-spherical surfaces such as rotationally symmetric non-spherical surfaces, surfaces of multi-focus lenses and toric surfaces, convex surfaces and concave surfaces can be used.

(Treatment with Plasma)

To more effectively suppress crystallization of pigments in the sublimation dye attached to the surface of the lens, it is preferable that a plastic lens which has been treated with plasma on the face for dying is used. It is considered that, when the face for dying of the plastic lens is treated with plasma, organic substances attached to the surface of the lens are removed, and the affinity of the surface of the lens with pigments is enhanced to facilitate obtaining the effect described above.

The process for the treatment with plasma is not particularly limited and can be conducted utilizing a conventional apparatus for the treatment with plasma. It is preferable that the output of plasma in the treatment with plasma is 40 to 500 W, more preferably 50 to 500 W, still more preferably 50 to 300 W, still more preferably 100 to 300 W and most preferably 200 to 300 W from the standpoint of suppressing unevenness in dying and the transmittance. The degree of vacuum is $1 \times 10^4$ Pa or smaller, preferably an approximate vacuum ($1 \times 10^{-3}$ to $1 \times 10^4$ Pa), more preferably $1 \times 10^{-3}$ to $1 \times 10^3$ Pa and most preferably $1 \times 10^{-2}$ to $2 \times 10^2$ Pa. When the output of plasma and the degree of vacuum are within the above ranges, the sufficient surface treatment can be achieved, and the phenomenon characteristic in the dying process with sublimation that pigments are crystallized at the surface of the lens when the sublimation dye in the ink comprising a sublimation dye is sublimated can be more effectively suppressed.

The treatment with plasma of the face for dying of the plastic lens is more effective when a plastic lens having a refractive index of 1.7 or greater (preferably 1.7 to 1.8 and more preferably 1.70 to 1.76) exhibiting difficulty in permeation of the sublimation dye into the inside of the lens is used.

(Dying a Plastic Lens)

As described above, after the plastic lens is placed in a manner such that the face for dying of the lens and the face of the substrate coated with the ink comprising a sublimation dye face each other, the sublimation dye in the ink comprising a sublimating ink coating the substrate is sublimated by heating the substrate obtained above under a degree of vacuum of $1 \times 10^4$ Pa or smaller so that the sublimation dye in the ink comprising a sublimation dye is attached to the plastic lens and allowed to permeate into the plastic lens.

The process for heating the substrate is not particularly limited. It is preferable that the heating is conducted by heating with a heater at the side to which the ink comprising a sublimation dye is not applied.

The sublimation of the sublimation dye is conducted by setting the temperature of the substrate preferably at 0 to 280° C., more preferably at 80 to 280° C., still more preferably at 120 to 270° C. and most preferably at 140 to 260° C. under a degree of vacuum of $1 \times 10^4$ Pa or smaller. When the temperature of the substrate is adjusted at the temperature in the above range, the sublimation dye in the ink comprising a sublimation dye can be sublimated sufficiently, and deformation and change in the color of the plastic lens facing the substrate due to the heat can be suppressed.

The degree of vacuum described above mean, in general, preferably an approximate vacuum ($1 \times 10^{-3}$ to $1 \times 10^4$ Pa). From the standpoint of suppressing crystallization of pigments in the sublimation dye at the surface of the lens, it is more preferable that the degree of vacuum is $1 \times 10^{-3}$ to $1 \times 10^3$ Pa, still more preferably $1 \times 10^{-2}$ to $8 \times 10^2$ Pa and most preferably $1 \times 10^{-2}$ to $6 \times 10^2$ Pa. When the degree of vacuum is made smaller than $1 \times 10^{-3}$ Pa, it is necessary that an apparatus of a higher performance be used.

The time of heating the substrate is not particularly limited. From the standpoint of dying the plastic lens to a great density and suppressing deformation and change in color of the plastic lens due to heat, it is preferable that the time of heating is 1 to 30 minutes, more preferably 1 to 15 minutes and most preferably 2 to 10 minutes.

(Step (3-1) and Step (3-2))

It is preferable that Step (3) is divided into Step (3-1) in which the sublimation dye is attached to the plastic lens and Step (3-2) in which the sublimation dye is allowed to permeate into the inside of the plastic lens so that dying of the plastic lens is achieved more uniformly. When Step (3) is divided into the two steps as described above, it is preferable that a substrate comprising an amorphous material exhibiting a small thermal conductivity such as glass is used as the substrate. When the substrate comprising an amorphous material is used, excessive conduction of heat to the plastic lens facing the substrate and permeation of the sublimation dye attached to the lens into the inside of the lens can be suppressed since the temperature of the substrate is not elevated to a degree more than necessary. Therefore, the step can be divided into the two steps as described above. Moreover, no temperature gradation is formed on the entire substrate in the operation of heating the substrate, and the uniform dying of the plastic lens can be facilitated. There is no possibility that the substrate is thermally deformed by the heating or chemical change takes place with various mixtures such as the sublimation dye.

When the step is divided into two steps as described above, in Step (3-1), the temperature of heating is set in a manner such that the temperature of the substrate is adjusted preferably at 50 to 220° C., more preferably at 80 to 200° C. and most preferably at 140 to 200° C. under a degree of vacuum of $1\times10^4$ Pa or smaller.

In Step (3-2) conducted as the next step, the temperature of heating is set in a manner such that the temperature of the lens is adjusted preferably at 70 to 150° C., more preferably at 80 to 150° C., still more preferably at 100 to 145° C. and most preferably at 115 to 140° C., in particular, when a plastic lens having a refractive index of 1.70 or greater is used although the temperature is different depending on the type of the lens.

It is preferable that the time of heating the substrate in Step (3-1) is 1 to 30 minutes, more preferably 1 to 15 minutes and most preferably 2 to 10 minutes when the temperature is in the range of "the prescribed temperature-20° C." to the prescribed temperature. It is preferable that the time of heating the plastic lens in Step (3-2) is 10 to 180 minutes, more preferably 20 to 120 minutes and most preferably 30 to 70 minutes when the temperature is in the range of "the prescribed temperature-20° C." to the prescribed temperature.

As the operation of heating in Step (3-2), it is preferable that the plastic lens to which the sublimation dye is attached in Step (3-1) is placed into a furnace (such as an oven) heated to the temperature in the above range in advance so that the sublimation dye is allowed to permeate uniformly into the plastic lens.

(Characteristics of the Dyed Plastic Lens)

The dyed plastic lens dyed as described above has a transmittance of 43% or smaller and a density of dying of 57 to 60% and contains the sublimation dye in a great concentration even when the plastic lens has a refractive index of 1.7 or greater. The dyed plastic lens obtained in accordance with the process of the present invention is dyed uniformly to a great density without unevenness even when the plastic lens has a refractive index of 1.7 or greater.

EXAMPLES

The present invention will be described more specifically with reference to examples in the following. However, the present invention is not limited to the examples. The evaluation of the appearance, the measurement of the transmittance and the calculation of the density of dying of dyed plastic lenses obtained in Examples and Comparative Examples were conducted as described in the following.

(i) Appearance: uneven dying

The presence or the absence of uneven dying and unevenness of dying due to crystallization of pigments in ink comprising a sublimation dye were examined under a fluorescent light by the direct observation with eyes and evaluated in accordance with the following criterion:

—Criterion for the Evaluation— good: no unevenness of dying found by direct observation with eyes (uniformly dyed in examination by an optical microscope)

fair: some uneven dying found by direct observation with eyes (pigments aggregated by crystallization found in examination by an optical microscope)

poor: uneven dying found by direct observation with eyes (ii) Transmittance

The transmittance of visual light at a wavelength of 585 nm was measured using a spectrophotometer "U3410" (manufactured by HITACHI Ltd.). The smaller the transmittance, the greater the density of dying.

(iii) Density of dying

The density of dying is a value expressing the density of the lens color and was obtained in accordance with the following equation (I):

$$\text{Density of dying}=100(\%)-\text{transmittance of visual light at 585 nm (\%)} \quad (I)$$

The transmittance of visual light in the above equation (I) is the value obtained in accordance with the method of measurement of the transmittance described above in (ii).

The following plastic lens was used in Examples and Comparative Examples.

(Plastic Lens)

"EYRY" (a trade name; manufactured by HOYA Corporation); a plastic lens having polysulfide linkage; the refractive index: 1.70; the thickness at the center: 1.4 mm; the dioptic power of the lens: 0.00; the diameter: 80 mm Preparation Example 1

Preparation of an Ink Comprising a Sublimation Dye

"DIANIX BLUE AC-E" (manufactured by DYSTAR JAPAN Co., Ltd.) as the sublimation dye was dispersed in water. An anionic surfactant, a nonionic surfactant and a moisturizer were mixed with the obtained dispersion, and an ink comprising a sublimation dye was prepared. The relative amounts of the components were as follows:

The sublimation dye/water/the anionic surfactant/the nonionic surfactant/the moisturizer=5/74.55/0.25/0.2/20 (the ratio by mass)

Example 1

Step (1)

The ink comprising a sublimation dye obtained in Preparation Example 1 was applied to a glass substrate at the ordinary temperature (22° C.) at points forming a grid with a distance of 3 mm using a dispenser under a pressure of application of 0.15 MPa in an amount of the entire applied ink of 0.4 g. The amount by mass per dot was 0.5 µg.

Step (2)

The content of water in the applied ink was decreased to 10% by mass of the entire ink by heating the glass substrate for 5 minutes at the face opposite to the face having the ink comprising a sublimation dye under the ordinary pressure while the temperature of the glass substrate was kept at 160° C.

Step (3-1)

After Step (2), the obtained glass substrate was placed in a dying apparatus by sublimation in a manner such that the glass substrate faced the plastic lens and was separated from the center of the plastic lens by 20 mm. The degree of vacuum was adjusted at $2 \times 10^2$ Pa. The sublimation dye was sublimated over 10 minutes by heating in a manner such that the temperature of the glass substrate was 180° C., and the sublimation dye was attached to the plastic lens.

Step (3-2)

The plastic lens obtained in Step (3-1) was placed in an oven heated at 140° C. and heated for 1 hour (the temperature of the plastic: 140° C.) so that the sublimation dye was allowed to permeate into the inside of the plastic lens.

Figure 1:
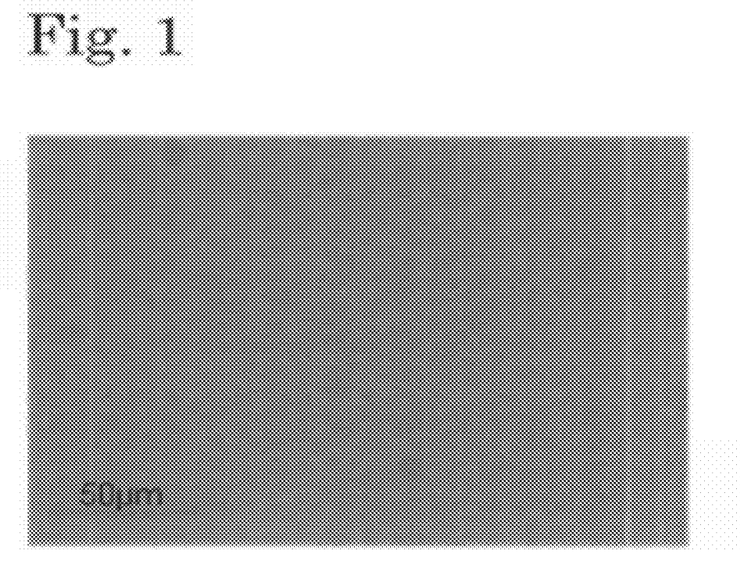
FIG. 1 shows an optical microscopic picture (the magnification: 1,000 times) exhibiting the dyed surface of a dyed plastic lens obtained in Example 1.

The result of the evaluation of the appearance, the result of the measurement of the transmittance and the result of the calculation of the density of dying of the obtained dyed plastic lens are shown in Table 1. The optical microscopic picture of the dyed face is shown in FIG. 1.

Example 2

Figure 2:
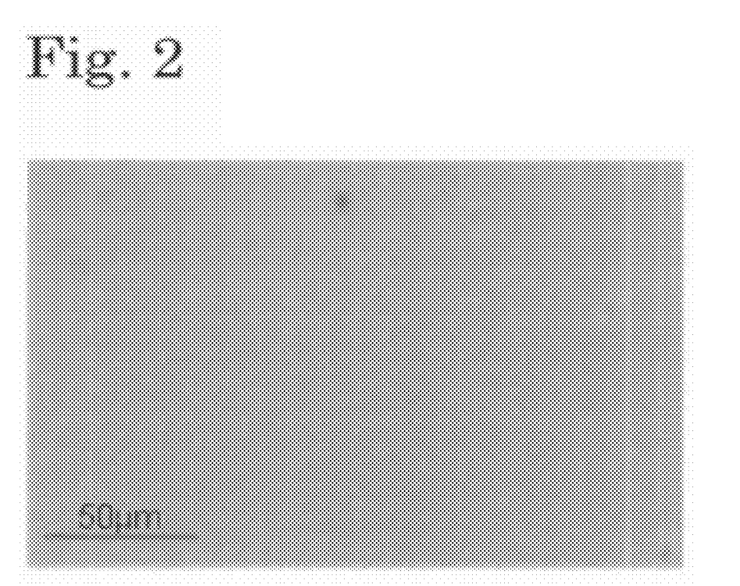
FIG. 2 shows an optical microscopic picture (the magnification: 1,000 times) exhibiting the dyed surface of a dyed plastic lens obtained in Example 2.

The same procedures as those conducted in Example 1 were conducted except that a plastic lens treated with plasma on the face for dying under the following condition was used. The result of the evaluation of the appearance; the result of the measurement of the transmittance and the result of the calculation of the density of dying of the obtained dyed plastic lens are shown in Table 1. The optical microscopic picture of the dyed face is shown in FIG. 2.
(Condition of Treatment with Plasma)
    Apparatus for the treatment with plasma: PC101A (manufactured by YAMATO SCIENTIFIC Co., Ltd.)
    Degree of vacuum: $1 \times 10^2$ Pa
    Output of plasma: 130 W
    Time of treatment: 120 seconds Example 3

Figure 3:
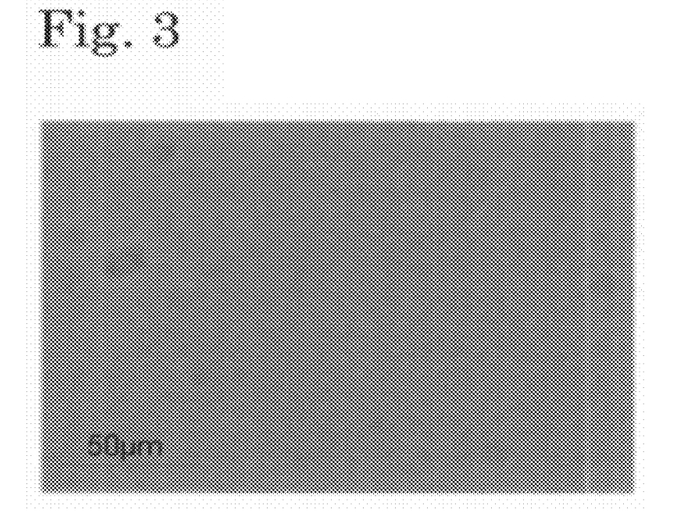
FIG. 3 shows an optical microscopic picture (the magnification: 1,000 times) exhibiting the dyed surface of a dyed plastic lens obtained in Example 3.

The same procedures as those conducted in Example 1 were conducted except that "heating at 160° C. for 5 minutes" in Step (2) in Example 1 was changed to "heating at 130° C. for 15 minutes", and the content of water in the ink was decreased to 50% by mass of the entire ink. The result of the evaluation of the appearance, the result of the measurement of the transmittance and the result of the calculation of the density of dying of the obtained dyed plastic lens are shown in Table 1. The optical microscopic picture of the dyed face is shown in FIG. 3.

Comparative Example 1

Figure 4:
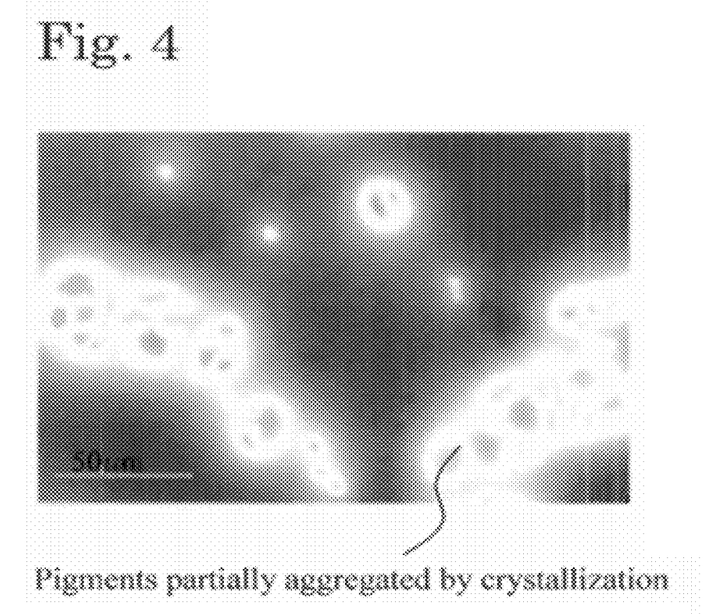
FIG. 4 shows an optical microscopic picture (the magnification: 1,000 times) exhibiting the dyed surface of a dyed plastic lens obtained in Comparative Example 1.

The same procedures as those conducted in Example 1 were conducted except that Step (2) was not conducted. The result of the evaluation of the appearance, the result of the measurement of the transmittance and the result of the calculation of the density of dying of the obtained dyed plastic lens are shown in Table 1. The optical microscopic picture of the dyed face is shown in FIG. 4.

Comparative Example 2

Figure 5:
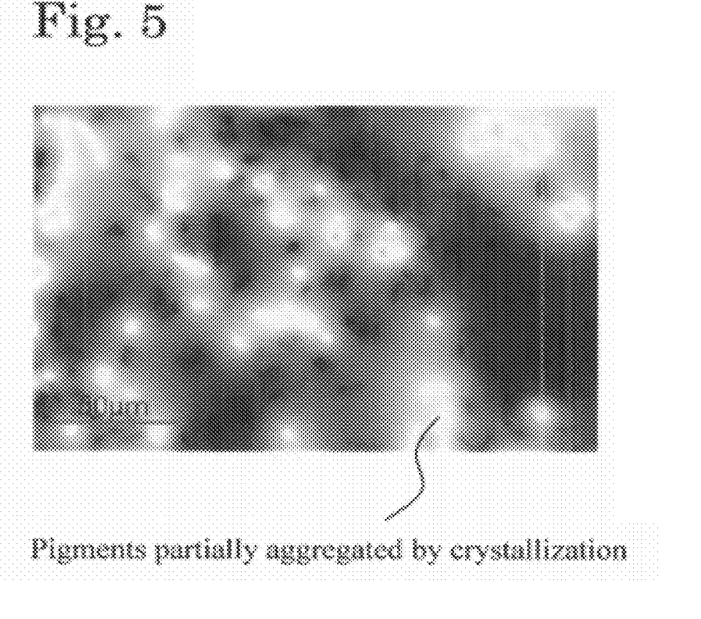
FIG. 5 shows an optical microscopic picture (the magnification: 1,000 times) exhibiting the dyed surface of a dyed plastic lens obtained in Comparative Example 2.

The same procedures as those conducted in Example 1 were conducted except that the temperature of heating of 160° C. in Step (2) in Example 1 was changed to the temperature of heating of 130° C., and the content of water in the ink was decreased to 70% by mass of the entire ink. The result of the evaluation of the appearance, the result of the measurement of the transmittance and the result of the calculation of the density of dying of the obtained dyed plastic lens are shown in Table 1. The optical microscopic picture of the dyed face is shown in FIG. 5.

Comparative Example 3

Figure 6:
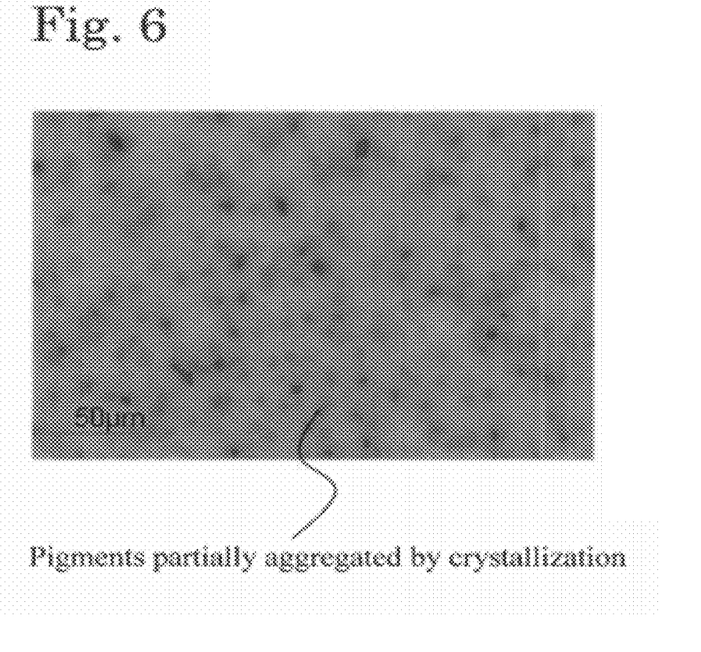
FIG. 6 shows an optical microscopic picture (the magnification: 1,000 times) exhibiting the dyed surface of a dyed plastic lens obtained in Comparative Example 3.

The same procedures as those conducted in Example 1 were conducted except that "heating at 160° C. for 5 minutes" in Step (2) in Example 1 was changed to "heating at 130° C. for 10 minutes", and the content of water in the ink was decreased to 60% by mass of the entire ink. The result of evaluation of the appearance, the result of the measurement of the transmittance and the result of the calculation of the density of dying of the obtained dyed plastic lens are shown in Table 1. The optical microscopic picture of the dyed face is shown in FIG. 6.

Comparative Example 4

The same procedures as those conducted in Example 1 were conducted except that the time of heating of 5 minutes in Step (2) in Example 1 was changed to the time of heating of 1 minute, and the content of water in the ink was decreased to 65% by mass of the entire ink.

Figure 7:
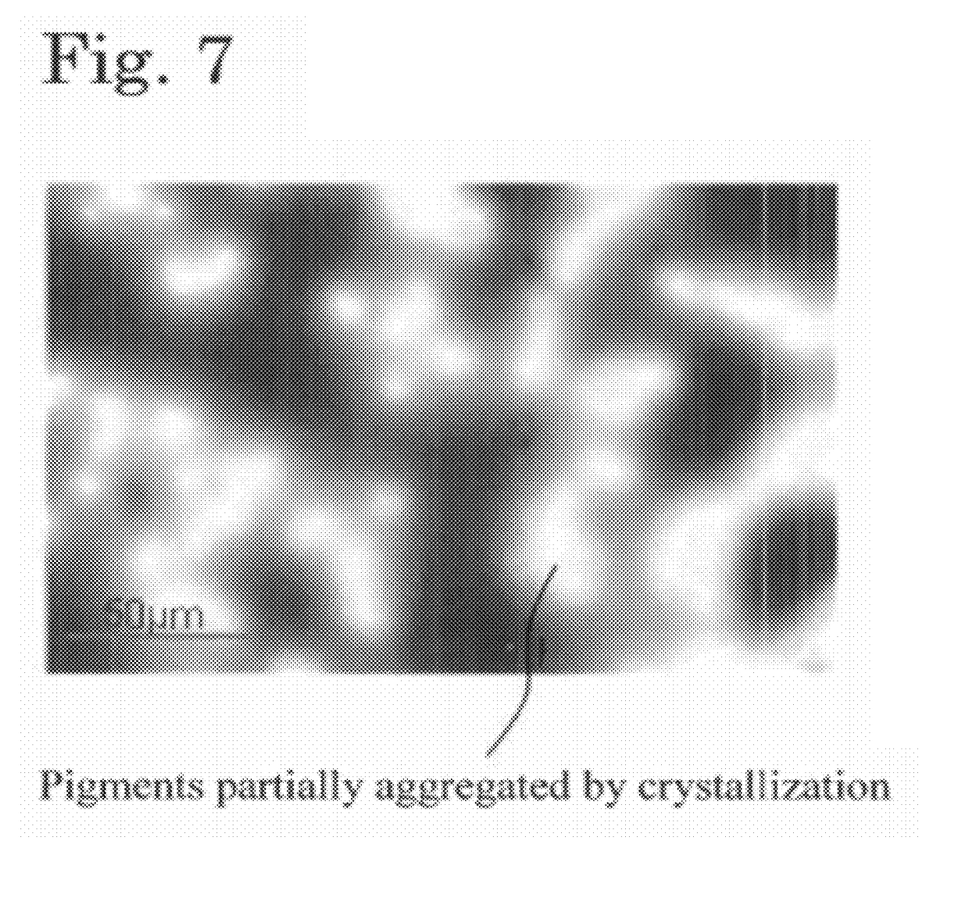
FIG. 7 shows an optical microscopic picture (the magnification: 1,000) times exhibiting the dyed surface of a dyed plastic lens obtained in Comparative Example 4.

The result of the evaluation of the appearance, the result of the measurement of the transmittance and the result of the calculation of the density of dying of the obtained dyed plastic lens are shown in Table 1. The optical microscopic picture of the dyed face is shown in FIG. 7.

TABLE 1

| | Appearance, uneven dying | Transmittance (%) | Density of dying (%) |
|---|---|---|---|
| Example 1 | good | 42.4 | 57.6 |
| Example 2 | good | 40.9 | 59.1 |
| Example 3 | good | 43.1 | 56.9 |
| Comparative Example 1 | poor | 42.4 | 57.6 |
| Comparative Example 2 | poor | 43.1 | 56.9 |
| Comparative Example 3 | fair | 43.1 | 56.9 |
| Comparative Example 4 | poor | 42.4 | 57.6 |

As shown by the results in Table 1 and FIGS. 1 to 3, the plastic lenses prepared in accordance with the present invention and having a refractive index of 1.70 were plastic lenses uniformly dyed to a great density without unevenness since the content of water in the ink comprising the sublimation dye was adjusted at 50% by mass or smaller in Step (2) (refer to Examples 1 to 3).

In contrast, it is shown by the results in Table 1 and FIGS. 4 to 7 that, when Step (2) was not conducted or the content of water in the ink comprising the sublimation dye is left remaining at a value exceeding 50% by mass after Step (2), crystallization of pigments in the sublimation dye took place on the surface of the lens, and the obtained plastic lenses were not uniform and were dyed unevenly when the plastic lenses were examined by observation using an optical microscope (refer to Comparative Example 1 to 4).

INDUSTRIAL APPLICABILITY

The dyed plastic lens obtained in accordance with the present invention is widely used as spectacles, sunglasses and goggles and, in particular, useful as the plastic lens for spectacles having a great refractive index of 1.7 or greater.

The invention claimed is:

1. A process for producing a dyed plastic lens which comprises conducting following steps (1), (2) and (3) in this order:
   Step (1): a step comprising coating a substrate at 60° C. or lower with an ink comprising a sublimation dye and water;
   Step (2): a step comprising decreasing content of water in the ink coating the substrate to 50% by mass or less of the entire ink; and
   Step (3): a step comprising, after placing a plastic lens in a manner such that a face for dying of the lens and a face of the substrate coated with the ink face each other, sublimating the sublimation dye in the ink coating the substrate by heating the substrate obtained after Step (2) under a degree of vacuum of $1\times10^4$ Pa or smaller to dye the plastic lens.

2. The process for producing a dyed plastic lens according to claim 1, wherein in Step (2) heating is conducted while temperature of heating is set in a manner such that temperature of the substrate is 0 to 250° C. under a degree of vacuum of $1\times10^{-3}$ Pa to an ordinary pressure.

3. The process for producing a dyed plastic lens according to claim 1, wherein the sublimation of the sublimation dye in Step (3) is conducted while the temperature of heating is set in a manner such that temperature of the substrate is 0 to 280° C. under a degree of vacuum of $1\times10^{-3}$ to $1\times10^3$ Pa.

4. The process for producing a dyed plastic lens according to claim 1, wherein Step (3) comprises following two steps of Steps (3-1) and (3-2):
   Step (3-1): a step comprising, after placing a plastic lens in a manner such that a face for dyeing of the lens and a face of the substrate coated with the ink face each other, sublimating the sublimation dye in the ink coating the substrate by heating the substrate obtained after Step (2) under a degree of vacuum of $1\times10^4$ Pa or smaller to attach the sublimated dye to the face for dyeing of the plastic lens without permeation into the plastic lens; and
   Step (3-2): a step comprising allowing the sublimation dye attached to the plastic lens to permeate into the lens by treatment of heating the plastic lens having the attached sublimation dye obtained in Step (3-1).

5. The process of producing a dyed plastic lens according to claim 2, wherein the sublimation of the sublimation dye in Step (3) is conducted while the temperature of heating is set in a manner such that temperature of the substrate is 0 to 280° C. under a degree of vacuum of $1\times10^{-3}$ to $1\times10^3$ Pa.

6. The process for producing a dyed plastic lens according to claim 2, wherein Step (3) comprises following two steps of Steps (3-1) and (3-2):
   Step (3-1): a step comprising, after placing a plastic lens in a manner such that a face for dyeing of the lens and a face of the substrate coated with the ink face each other, sublimating the sublimation dye in the ink coating the substrate by heating the substrate obtained after Step (2) under a degree of vacuum of $1\times10^4$ Pa or smaller to attach the sublimated dye to the face for dyeing of the plastic lens without permeation into the plastic lens; and
   Step (3-2): a step comprising allowing the sublimation dye attached to the plastic lens to permeate into the lens by treatment of heating the plastic lens having the attached sublimation dye obtained in Step (3-1).

7. The process for producing a dyed plastic lens according to claim 3, wherein Step (3) comprises following two steps of Steps (3-1) and (3-2):
   Step (3-1): a step comprising, after placing a plastic lens in a manner such that a face for dyeing of the lens and a face of the substrate coated with the ink face each other, sublimating the sublimation dye in the ink coating the substrate by heating the substrate obtained after Step (2) under a degree of vacuum of $1\times10^4$ Pa or smaller to attach the sublimated dye to the face for dyeing of the plastic lens without permeation into the plastic lens; and
   Step (3-2): a step comprising allowing the sublimation dye attached to the plastic lens to permeate into the lens by treatment of heating the plastic lens having the attached sublimation dye obtained in Step (3-1).

8. The process for producing a dyed plastic lens according to claim 5, wherein Step (3) comprises following two steps of Steps (3-1) and (3-2):
   Step (3-1): a step comprising, after placing a plastic lens in a manner such that a face for dyeing of the lens and a face of the substrate coated with the ink face each other, sublimating the sublimation dye in the ink coating the substrate by heating the substrate obtained after Step (2) under a degree of vacuum of $1\times10^4$ Pa or smaller to attach the sublimated dye to the face for dyeing of the plastic lens without permeation into the plastic lens; and
   Step (3-2): a step comprising allowing the sublimation dye attached to the plastic lens to permeate into the lens by treatment of heating the plastic lens having the attached sublimation dye obtained in Step (3-1).

9. The process of producing a dyed plastic lens according to claim 1, wherein the dyed plastic lens has a refractive index of 1.7 or greater.

10. The process of producing a dyed plastic lens according to claim 1, wherein the dyed plastic lens has a refractive index of 1.7 to 1.8.

11. The process of producing a dyed plastic lens according to claim 1, wherein the temperature in Step (1) is from 10 to 50° C.

12. The process of producing a dyed plastic lens according to claim 1, wherein the temperature in Step (1) is from 15 to 30° C.

13. The process of producing a dyed plastic lens according to claim 1, wherein the ink comprises at least one of an anionic surfactant and a nonionic surfactant.

14. The process of producing a dyed plastic lens according to claim 1, wherein the ink comprises a combination of an anionic surfactant and a nonionic surfactant.

15. The process of producing a dyed plastic lens according to claim 1, wherein in Step (2), the content of water is decreased to 20% by mass or less of the entire ink.

16. The process of producing a dyed plastic lens according to claim 1, wherein Step (2) is carried out by heating and sublimation of the sublimation dye is suppressed to 5% by mass or smaller, including 0% by mass.

17. The process of producing a dyed plastic lens according to claim 1, wherein the plastic lens in Step (3) is derived from a raw material comprising a homopolymer of monomers having sulfide linkage or copolymers of monomers having sulfide linkage and at least one other monomer.

18. The process of producing a dyed plastic lens according to claim 1, wherein the plastic lens has been treated with plasma on its face for dyeing.

19. The process of producing a dyed plastic lens according to claim 4, wherein Step (3-1) is carried out at a temperature of from 140 to 200° C. and Step (3-2) is carried out at a temperature of from 115 to 140° C.

* * * * *